United States Patent [19]

Hammerquist

[11] Patent Number: 4,788,548

[45] Date of Patent: Nov. 29, 1988

[54] PHASE MEASUREMENT RANGING

[75] Inventor: Earl L. Hammerquist, Thousand Oaks, Calif.

[73] Assignee: ITT Gilfillan, A Division of ITT Corporation, Van Nuys, Calif.

[21] Appl. No.: 95,365

[22] Filed: Sep. 8, 1987

[51] Int. Cl.$^4$ ............................................. G01S 00/00
[52] U.S. Cl. ..................................... 342/458; 342/442
[58] Field of Search ............... 342/458, 442, 407, 411, 342/417

[56] References Cited

U.S. PATENT DOCUMENTS

| | | |
|---|---|---|
| 3,735,405 | 5/1973 | Berg . |
| 3,798,645 | 9/1976 | Baurle et al. . |
| 3,873,984 | 3/1975 | Weisbrich, Jr. .................. 342/458 |
| 3,916,410 | 10/1975 | Elwood ............................ 342/458 |
| 3,953,856 | 4/1976 | Hammack ........................ 342/458 |
| 3,981,008 | 3/1974 | Mann . |
| 3,993,997 | 11/1976 | Jackson . |
| 4,041,494 | 8/1977 | Ewen et al. ..................... 342/458 |
| 4,176,357 | 11/1979 | Fales, III . |
| 4,393,382 | 7/1983 | Jones . |
| 4,604,626 | 8/1986 | Stromswold . |
| 4,613,867 | 9/1986 | Golinsky ......................... 342/458 |
| 4,626,860 | 12/1986 | Tricoles et al. ................. 342/442 |
| 4,626,861 | 12/1986 | Wiley .............................. 342/458 |
| 4,642,649 | 2/1987 | Lightfoot ........................ 342/458 |
| 4,670,757 | 6/1987 | Munich et al. . |
| 4,670,758 | 6/1987 | Campbell . |
| 4,675,684 | 6/1987 | Spence ........................ 342/458 X |

*Primary Examiner*—Theodore M. Blum
*Assistant Examiner*—John B. Sotomayor
*Attorney, Agent, or Firm*—Robert A. Walsh; Thomas N. Twomey; Mary C. Werner

[57] ABSTRACT

A passive radar ranging system having an antenna system for receiving radiated electromagnetic energy emanating from an emitter source, plus a translation resolution system and a digital computation system for making phase measurements of the received electromagnetic energy with the translated and resolved energy signals being operated upon by a plurality of system spacing parameters, the radiated energy being modulated in a particular pattern, randomly modulated or unmodulated and with the emitter source being fixed or moving while the phase measurements are made from a single measurement platform which may also be fixed or moving with respect to the emitter source, the phase measurements being employed for determining the instantaneous range from the emitter source to the measurement platform.

48 Claims, 3 Drawing Sheets

$\angle FOD = \psi/2$
$\angle OFC = 90°$

PHASE MEASUREMENT RANGING

BACKGROUND OF THE INVENTION

This invention relates to radar systems, and more particularly, to radar systems providing instantaneous ranging from parameters determinable entirely at a passive location.

Methods known in the past employed for passive location of radar emitter sources required the knowledge of several parameters related to the operation of the emitter source measurements made from two or more known spatial locations, and/or the known rate of relative motion of the emitter source.

In a first known method, knowledge of the waveform modulation of the emitter source in the time or frequency domain was required. An example of such a requirement included the scan rate, the pulse duration, the pulse interval and/or the frequency modulation patterns.

In a second known method, measurements had to be provided in the form of the emitter signal angle of arrival or the emitter signal time of arrival. Measurements in the form of the angle of arrival were described in the process of triangulation while measurements in the form of time of arrival where described in the process of trilateration. The emitter signal measurements of angle and time of arrival were then employed in conjunction with the time and location of the measurements to ascertain emitter location.

The third known method utilized for determining the range to a radar emitter involved the measurement of angular rates between the emitter source and the measurements site/platform.

Further, the prior art also included a method and an apparatus wherein a passive station can determine its position relative to a transmitting station which is stationary or moving. The transmitting station transmits a narrow pulsed scanning beam and the passive station can utilize the pulses received directly from the transmitting station and the reflected pulses received from a plurality of scatterer objects. The apparatus employs a direction finding antenna to determine a bearing of the transmitter station relative to the passive station. Further, a set of differential time signals are measured for transmitting a pulse from the transmitter to each of the scatterer objects and then to the passive station. Also, a set of transmitter pointing angles is determined, the pointing angles located between the transmitter-scatterer lines and the transmitter-passive station line. A second set of angles is determined to locate each scatterer-passive station line with respect to the transmitter-passive station reference line. A set of ranges is calculated from the above data and then averaged and weighted for the position determination.

Each of the previously described methods are very involved requiring data of a plurality of parameters. Thus, a major problem exists when the compilation of data is not available. It is highly desirable that the range to the emitter source be established when the waveform of the emitter signal is unmodulated or is randomly modulated. It is further desirable that the range to emitter source be established by requiring only those measurements available from a single location and that the knowledge of relative motion between the emitter source and the measurement platform is not necessary.

Hence, those concerned with the development and use of passive measurement systems in the radar field have long recognized the need for improved passive ranging systems which enable the determination of the emitter range when the waveform of the emitter signal is unmodulated or randomly modulated, when parameter measurements are available only from a single location and when knowledge of the relative motion between the emitter source and the measurement platform is not available. The present invention fulfills all of these needs.

SUMMARY OF THE INVENTION

Briefly, and in general terms, the present invention provides a new and improved radar passive ranging system embodying novel methods and apparatus which substantially reduces the plurality of parameter data required to determine the range to an emitter source and substantially simplifies the determination of the instantaneous range to an emitter source by making phase measurements of the radiations emanating from the source. Moreover, the passive ranging system of the present invention will determine the range to a fixed or moving emitter source when the waveform of the emitter signal is unmodulated or is randomly modulated, when the parameter measurements are available only from a single fixed or moving measuring location, and when knowledge of the relative motion between the emitter source and the measuring platform is not available.

Basically, the present invention is directed to an improved passive ranging method and apparatus for substantially simplifying the determination of the instantaneous range to an emitter source. This is accomplished by making phase measurements of the radiations emanating from the emitter source. The radiations may be modulated in a particular pattern, randomly modulated or unmodulated. Further, the emitter source may be fixed or moving while the measurements are made from a single measurement platform which also may be fixed or moving.

In accordance with the invention, the passive ranging system includes an appropriate antenna system for capturing the radiated emitter signal energy at the frequencies of interest. Each of a plurality of antenna elements is located along a straight line, each referenced to a particular antenna element with the range to the emitter defined as the distance from the reference antenna element to the emitter source. Each of the ranges from the other antenna elements to the emitter source is measured with respect to the distance from the reference antenna element to the emitter source.

Additionally, the passive ranging system further includes a frequency translation apparatus connected to each antenna element with each of the frequency translators delivering an appropriate signal to a frequency resolver or a phase resolving network. The frequency resolver then transmits an output signal to the phase resolving network. The passive ranging system also includes a plurality of computation and calibration equipment.

The invention is based upon the physical phenomena associated with electromagnetic wave propagation. The passive ranging system determines the range to the emitter based solely on measurements of relative phase of the electromagnetic wave impinging off the several antenna elements of the antenna system.

The new and improved passive ranging system of the present invention substantially simplifies the determination of the instantaneous range to an emitter source. Hence, the ranging system will determine the range to a fixed or moving emitter source when the emitter signal waveform is unmodulated or is randomly modulated, and when the parameter measurements are available only from a single location which may be either fixed or moving. Further, knowledge of the relative motion between the emitter source and the measuring platform is not required.

These and other objects and advantages of the invention will become apparent from the following more detailed description, taken in conjunction with the accompanying drawings, which illustrate, by way of example, the features of the invention.

DETAILED DESCRIPTION OF THE PREFERRED EMBODIMENT

Figure 1:
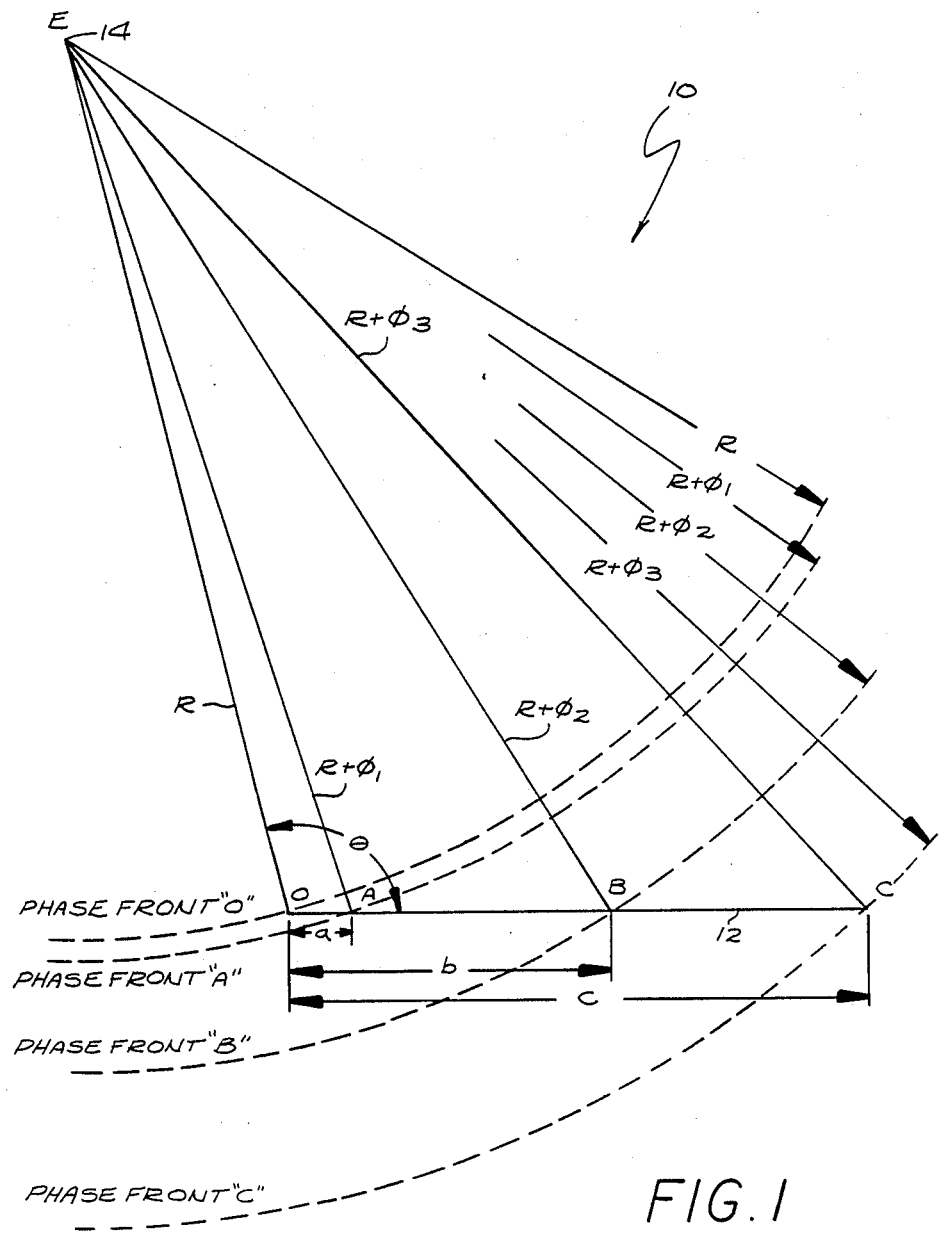
FIG. 1 is a graphical illustration of the geometry of the spatial emitter radiations and the antenna system of a passive ranging system in accordance with the present invention.

As shown in the drawings for purposes of illustration, the invention is embodied in a radar passive ranging system 10 of the type having an appropriate antenna system 12 for capturing radiated signal energy at certain frequencies from an emitter source 14, a translation—resolution system 16 and a digital computation system 18 for calculating the instantaneous range to the emitter source.

In the past, the methods employed for passive location of radar emitter sources required the knowledge of several parameters related to the operation of the emitter source, measurements made from two or more known spatial locations or the known rate of relative motion of the emitter source. Either knowledge of the waveform modulation of the emitter source in the time or frequency domain was required or emitter signal angle of arrival or time of arrival measurements were necessary or measurements of angular rates between the emitter source and the measurements platform were required.

Each of the prior methods were very involved requiring data from a plurality of parameters. The absence of the necessary parameter measurements created a major problem. Thus, it has been a long felt need in the radar art that the range to the emitter source be established when the waveform of the emitter signal is unmodulated or is randomly modulated and when parameter measurements are available only from a single location and when knowledge of the relative motion between the emitter source and the measurement platform measurement is not available.

In accordance with the present invention, the antenna system 12 and the translation resolution system 16 cooperate to intercept the emitter source radiated energy and to translate the signal frequencies for detection and phase measurement and to provide oriented digital phase measurements which are corrected and manipulated to provide a resultant instantaneous range measurement. Further, the passive ranging system significantly reduces the necessary parameter measurements required to determine the range measurement by enabling measurement of the emitter signal when the signal waveform is unmodulated or randomly modulated, when parameter measurements are available only from a single location and when knowledge of the relative motion between the emitter source and the measurement platform is not available.

The emitter source 14 is an energy radiating device that transmits and receives electromagnetic energy and which is illustrated at location "E" in FIG. 1. The antenna system 12 includes a plurality of antenna elements located on a straight line at points designated O, A, B, and C. A plurality of phase fronts which are loci of equal electrical phase associated with the location of each of said antenna elements are denoted as phase fronts O, A, B, and C, respectively. The geometric relationships of the radiated electromagnetic energy represented by the plurality of phase fronts O, A, B and C, the emitter source 14 and the plurality of antenna elements of the antenna system 12 are illustrated in FIG. 1.

Note that all relative phase measurements are referenced to the antenna element located at point "O". The range to the emitter source 14 which is the measurement of interest as line "EO" is denoted as "R". The measurement of range to the emitter source 14 from the other antenna elements located at points A, B and C are $$\overline{EA} = R + \phi_1; \quad (1)$$

$$\overline{EB} = R + \phi_2; \text{ and} \quad (2)$$

$$\overline{EC} = R + \phi_3. \quad (3)$$

The phase symbols $\phi_1$, $\phi_2$, and $\phi_3$ represent the relative electrical phase between the antenna element at point "O" and the remaining antenna elements located at points A, B and C. The electrical phase is converted into the same units as range and is referenced to the antenna element located at point "O".

It is noted that the phase measurements are ambiguous, such that $$\phi_3 = N\lambda + (\phi_{3m}/\lambda) \quad (4)$$

where $\phi_{3m}$ is the measured value, $\lambda$ is the wavelength in meters and is equal to the speed of light (C) divided by the operating frequency ($\nu$) of the emitter source 14, N is an integer equal to or greater than zero, and $\phi_3$ is the ambiguous phase difference measured in meters between the phase front "O" and the phase front "C". Resolution of the phase ambiguity is discussed hereinafter.

The angle $\theta$ shown in FIG. 1 is that angle described between line $\overline{EO}$ and line $\overline{OC}$. The line $\overline{EO}$ is denoting the range to the emitter source 14 or "R" while the line $\overline{OC}$ is the line containing each antenna element of the antenna system 12. The derivation of the system mathematical expression for the range measurement is shown below. A basic formulation is shown first which is followed by the formulation for phase ambiguity resolution.

The range "R" to the emitter source 14 is determined by equating the cosine of angle $\theta$ in triangle OEB to the cosine of angle $\theta$ in triangle OEC using the law of cosines. The general form for the law of cosines is:

$$C^2 = A^2 + B^2 - 2AB \cos \theta \tag{5}$$

and solving for Cos $\theta$ results in the following expression, $$\cos \theta = \frac{A^2 + B^2 - C^2}{2AB}. \tag{6}$$

Applying this expression to triangles OEB and OEC provides the following expression:

$$\cos \theta = \frac{R^2 + b^2 - (R + \phi_2)^2}{2Rb} = \frac{R^2 + c^2 - (R + \phi_3)^2}{2Rc}. \tag{7}$$

Expanding the equation, collecting terms and solving for "R" results in:

$$R = \frac{bc(c-b) - (b\phi_3^2 - c\phi_2^2)}{2(b\phi_3 - c\phi_2)}. \tag{8}$$

Equation (8) may be written in the following equivalent form:

$$R = \frac{(c-b)(bc - \phi_2\phi_3)}{2(b\phi_3 - c\phi_2)} - \frac{\phi_3 - \phi_2}{2}. \tag{9}$$

It is significant to note that the term $[(\phi_3 - \phi_2)/2]$ adds little to the accuracy of the range measurement and can be eliminated without affecting the range measurements of interest. Examination of the range geometric relationships depicted in FIG. 1 show that the product ($\phi_2 \phi_3$) has little effect on the accuracy of the range measurements when the angle $\theta$ approaches 90°. This is the case because the cosine 90° is equal to zero and this situation exists when the emitter vector line $\overline{EO}$ approaches the orthogonal position to the antenna array line $\overline{OC}$. However, the product ($\phi_2 \phi_3$) is important to range accuracy as the angle $\theta$ approaches zero because the cosine 0°. is equal to 1. The treatment of the product ($\phi_2 \phi_3$) is discussed hereinafter.

The denominator of the equation (9) is the critical term for determining the range to the emitter source 14 at any angle $\theta$. It is shown below that the anbiguities associated with the required phase measurements of ($\phi_2$) and ($\phi_3$) cancel when the emitter is of sufficient range, a range that can be quantified and is much shorter than the range of interest.

The effect of the ambiguities in the phase measurements of ($\phi_2$) and ($\phi_3$) may be determined by examining the denominator term (b$\phi_3$ − c$\phi_2$) at the limits. The limits are defined when the angle $\theta$ approaches zero or 180° and when the angle $\theta$ approaches 90°. When the angle $\theta$ approaches zero or 180°, ($\phi_2$) is nearly equal to "b" while ($\phi_3$) is nearly equal to "c". Thus, the term (b$\phi_3$ − c$\phi_2$) is nearly equal to zero and any ambiguities in the phase measurements will cancel at all values of "R". This situation is most readily visualized by reference to FIG. 1.

By applying the law of cosines to the triangle OEB, as appearing in FIG. 1, the cosine of the angle $\theta$ is:

$$\cos \theta = \frac{b^2 - 2R\phi_2 - \phi_2^2}{2bR}. \tag{10}$$

As the angle $\theta$ above approaches 90°, the expression of equation (10) may be equated to zero. After transposing the equation, the result is:

$$\phi_2^2 + 2R\phi_2 - b^2 = 0 \tag{11}$$

which is a quadratic expression. Employing the quadratic equation and solving for the ambiguous phase difference measured in meters between the phase front O and the phase front B produces the following expression:

$$\phi_2 = -R + \sqrt{R^2 + b^2} \tag{12}$$

where the radical sign must be positive because $\phi_2$ is greater than (−R).

Similarly, by applying the Law of cosines to the triangle OEC, appearing in FIG. 1, the cosine of the angle $\theta$ is:

$$\cos \theta = \frac{c^2 - 2R\phi_3 - \phi_3^2}{2Rc}. \tag{13}$$

As the angle $\theta$ again approaches 90°, the expression of equation (13) may be equated to zero and after transposing the equation, the result is:

$$\phi_3^2 + 2R\phi_3 - c^2 = 0 \tag{14}$$

After applying the quadratic equation, the following expression, which describes the ambiguous phase difference measured in meters between the phase front O and the phase front C, is arrived at:

$$\phi_3 = -R + \sqrt{R^2 + c^2}. \tag{15}$$

Thus the expression in the denominator of equation (9) is:

$$(b\phi_3 - c\phi_2) = -R(b - c) + R\left[b\sqrt{1 + b^2/R^2} - c\sqrt{1 + c^2/R^2}\right]. \tag{16}$$

By employing the first order approximation of a series expansion, the following expression is determined:

$$(b\phi_3 - c\phi_2) = \frac{bc(c-b)}{2R}. \tag{17}$$

In this situation when the angle $\theta$ approaches 90°, the ambiguities will not cancel for all values of "R". However, if the distance of the quantity (b$\phi_3$ − c$\phi_2$) is less than the distance of the wavelength ($\lambda$), the range measurement is unaffected by the phase measurement ambiguities. Thus, the following restriction is imposed using equation (17) as the criteria, that $$R > \frac{bc(c-b)}{2\lambda}. \tag{18}$$

As will be shown, this restriction can easily be accommodated.

A fourth antenna element of the antenna system 12 is located at point "A" shown in FIG. 1. The purpose of the fourth antenna element is for resolving the phase ambiguities of the product ($\phi_2 \phi_3$) and to permit short range measurements. The spacing of the fourth antenna element is a distance "a" and is defined as a distance of is less than or equal to the wavelength "$\lambda/2$" for the frequencies of interest.

For the triangles OEA, OEB and OEC illustrated in FIG. 1, the following equations can be derived in a manner similar to that employed for equation (7) using the Law of cosines:

$$\cos\theta = \frac{R^2 + a^2 - (R + \phi_1)^2}{2Ra} = \frac{R^2 + b^2 - (R + \phi_2)^2}{2Rb} \quad (19)$$

Solving for the term ($\phi_2$) in the equated quantities provides:

$$\phi_2 = -R + R\sqrt{1 + (b/aR^2)[a(b-a) + 2R\phi_1 + \phi_1^2]}. \quad (20)$$

Since the term $2R\phi_1$ is much greater than the term $[a(b-a)]$ and the term $2R\phi_1$ is much greater than the term $(\phi_1^2)$ then equation (20) is reduced to the approximate equality:

$$\phi_2 \approx -R + R\sqrt{1 + (2b\phi_1/aR)}. \quad (21)$$

Again, using the first order approximation of the series expansion of the radical and collecting terms:

$$\phi_2 \approx (b\phi_1/a) \quad (22)$$

Similarly, if the cosine $\theta$ for triangles OEA and OEC are equated, the following expression results:

$$\cos\theta = \frac{R^2 + a^2 - (R + \phi_1)^2}{2Ra} = \frac{R^2 + c^2 - (R + \phi_3)^2}{2Rc}. \quad (23)$$

Solving for the term $\phi_3$ in the equated expressions, deleting small terms and approximating to the first order the series expansion of the radical and collecting terms results in the following expression:

$$\phi_3 \approx (c\phi_1/a). \quad (24)$$

Therefore, the term ($\phi_2 \phi_3$) in the numerator of equation (9) is:

$$\phi_2\phi_3 \approx (bc\phi_1^2/a^2). \quad (25)$$

Substituting the expression for ($\phi_2 \phi_3$) in equation (25) into equation (9) and dropping the insignificant term ($\phi_3 - \phi_2$)/2, combining terms and simplifying results in the equation:

$$R = \frac{bc(c - b)(a^2 - \phi_1^2)}{2a^2(b\phi_3 - c\phi_2)}. \quad (26)$$

where $R > \frac{bc(c-b)}{2\lambda}$ and "$a$" $\leq \frac{\lambda}{2}$.

The range measurements of equation (26) were derived from the wide antenna element spacings "b" and "c". For range measurements shorter than those measurements indicated by equation (26), measurements from the antenna element of the antenna system 12 having shorter spacings "a" provides the following expression:

$$R = \frac{ba(b - a)(a^2 - \phi_1^2)}{2a^2(a\phi_2 - b\phi_1)} \quad (27)$$

where "R" is greater than ($b^2/2$) and the distance "a" is less than or equal to the wavelength ($\lambda$) of the received electromagnetic energy. Equation (27) was derived from equating the formulae for the triangles OEA and OEB utilizing the Law of cosines. Triangles OEA and OEB are employed in this instance since points "A" and "B" are closest to the reference point "O".

External phase measurement calibration is performed using known ranges "R" and angles "$\theta$" over the signal amplitude and frequency ranges anticipated. The following equations for calibration are derived from FIG. 1:

$$\phi_{1t} = -R[1 - \sqrt{1 + \frac{a^2 - 2Ra\cos\theta}{R^2}} - 1] - N_1\lambda; \quad (28)$$

$$\phi_{2t} = -R[1 - \sqrt{1 + \frac{b^2 - 2Rb\cos\theta}{R^2}} - 1] - N_2\lambda; \text{ and}$$

$$\phi_{3t} = -R[1 - \sqrt{1 + \frac{c^2 - 2Rc\cos\theta}{R^2}} - 1] - N_3\lambda.$$

Note that "N" is selected to produce a ($\phi_t$) less than the wavelength ($\lambda$). Phase values calculated from the external phase measurement calibration equations (28) denote the calculated "truth" and are designated by the subscript "t". However, measured values are shown below with a subscript "m". The actual calibration constants designated by a subscript "c" are obtained by subtraction of the measured value from the phase value as follows:

$$\phi_{2t} - \phi_{2m} = \phi_{2c}. \quad (29)$$

After the calibration constant is obtained, the constant is stored in a look-up table for application to all future measurements. Operating parameters are corrected by subtracting the calibration constant from the measured value as follows:

$$\phi_{2m} + \phi_{2c} = \phi_2. \quad (30)$$

The look-up table is physically contained in digital memory which is structured by the angle "$\theta$", the range "R", the amplitude and the frequency. This calibration technique, which includes range in calculating "truth", is an improvement and an advantage to conventional techniques for phase calibration and provides an important vernier required for accurate range measurements.

Figure 2:
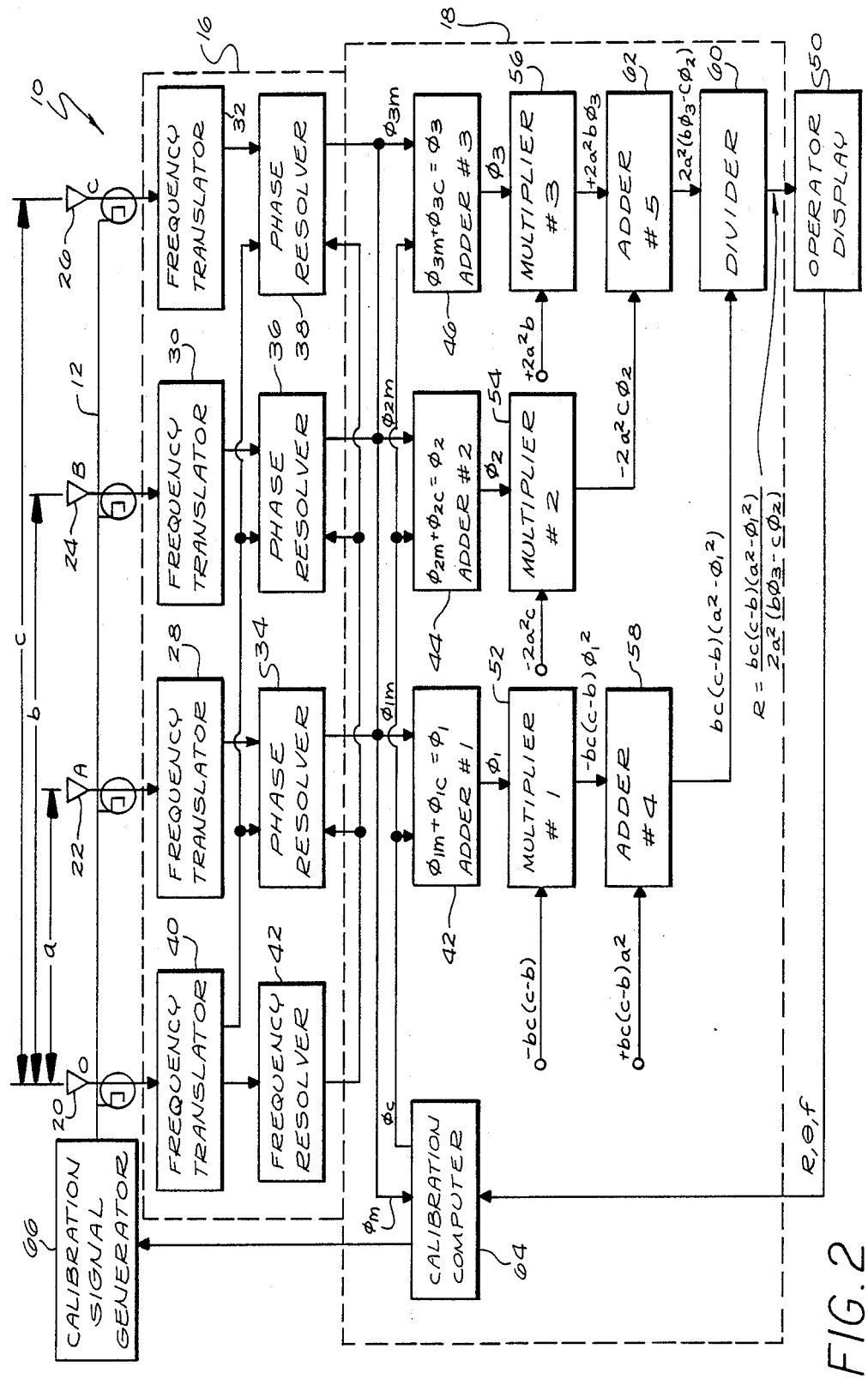
FIG. 2 is a schematic block diagram of the passive ranging system of FIG. 1.

The implementation of the invention includes a plurality of four antenna elements designated 20, 22, 24 and 26 located respectively at points O, A, B and C of the antenna system 12. The plurality of antenna elements 20, 22, 24 and 26 are aligned in a linear array and spaced at distances a, b and c from the reference element "O" as shown in FIG. 2.

The energy collected at antenna elements 22, 24 and 26 is fed to the translation resolution system 16 to be translated in frequency for detection and phase measurement. Energy collected at antenna elements 22, 24 and 26 is transferred to a corresponding plurality of frequency translators 28, 30 and 32. The outputs of the frequency translators 28, 30 and 32 are transmitted to a plurality of phase resolvers 34, 36 and 38 with translators 28, 30 and 32 respectively feeding resolvers 34, 36 and 38.

Energy arriving at antenna element "O" is initially routed to a frequency translator 40. The output frequency from translator 40 is transmitted to the phase resolvers 34, 36 and 38 in channels A, B, and C respectively to establish a common reference for differential phase measurements. A portion of the energy received at antenna element "O" is routed to a frequency resolver 42 from translator 40. The frequency measurement created by the resolver 42 is transferred to the resolvers 34, 36 and 38 where it is utilized in the phase measurement process to produce distance oriented digital phase measurements $\phi_{1m}$, $\phi_{2m}$ and $\phi_{3m}$. The distance oriented measurements $\phi_{1m}$, $\phi_{2m}$ and $\phi_{3m}$ are measured in meters and are the output signals of the resolvers 34, 36 and 38.

The outputs $\phi_{1m}$, $\phi_{2m}$ and $\phi_{3m}$ from the phase resolvers 34, 36 and 38 are transmitted to the digital computer 18 where they are corrected using a plurality of stored calibration constants $\phi_{1c}$, $\phi_{2c}$ and $\phi_{3c}$ in a plurality of adders 42, 44 and 46. The first adder 42 adds the first calibration constant $\phi_{1c}$ to the first phase measurement $\phi_{1m}$ to provide the corrected phase operating parameter $\phi_1$. The second adder 44 and the third adder 46 respectively add the second and third calibration constants $\phi_{2c}$ and $\phi_{3c}$ to the second and third phase measurements $\phi_{2m}$ and $\phi_{3m}$ for providing the corrected phase operating parameters $\phi_2$ and $\phi_3$.

The corrected phase measurements $\phi_1$, $\phi_2$ and $\phi_3$ are operated on as hereinafter described with reference to FIG. 2 using the stored system parameters which are the spacings for the antenna system 12. The antenna spacings a, b and c are stored in the computer 18 for manipulating the corrected phase measurements and the resultant calculated range measurement "R" is transferred to an operator display 50 for viewing.

The corrected phase measurements $\phi_1$, $\phi_2$ and $\phi_3$ are transmitted to a plurality of multipliers 52, 54 and 56 with the first adder 42 feeding measurement $\phi_1$ to a first multiplier 52, the second adder 44 feeding measurement $\phi_2$ to a second multiplier 54, and the third adder 46 feeding measurement $\phi_3$ to a third multiplier 56. The multipliers 52, 54 and 56 are then manipulated by the stored system parameters in the following manner. The multiplier 52 is fed the combination of parameters $[-bc(c-b)]$ while the multiplier 54 is fed the combination of parameters $(-2a^2c)$. Next, the multiplier 56 is fed the combination of parameters $(+2a^2b)$. The output of the first multiplier 52 is the quantity $[-bc(c-b)\phi_1^2]$ while the output of the second multiplier 54 is $(-2a^2c\phi_2)$. The third multiplier 56 has an output quantity of $(+2a^2b\phi_3)$.

The output of the first multiplier is fed to a fourth adder 58 and is added to a quantity $[+bc(c-b)a^2]$ providing an output term $[bc(c-b)(a^2-\phi_1^2)]$ which is delivered to a divider 60. The outputs of the second multiplier 54 and the third multiplier 56 are summed together in a fifth adder 62 providing an output quantity of $[2a^2(b\phi_3-c\phi_2)]$. The output of the fifth adder 62 is fed to the divider 60 and assumes the position of the denominator in the divisional fraction for the range measurement "R" while the output of the fourth adder 58 assumes the position of the numerator. The output of the divider 60 is illustrated below:

$$R = \frac{bc(c-b)(a^2 - \phi_1^2)}{2a^2(b\phi_3 - c\phi_2)} \qquad (31)$$

which is transmitted to the operator display 50 for operator viewing and for transmission to calibration apparatus.

Calibration of the passive ranging system 10 is performed employing both external and internal stimuli. For external calibration, the angle $\theta$ location, the frequency and range signals of the external emitter source 14 are transmitted from the operator display 50 to a calibration computer 64. The calibration computer 64 computes the plurality of truth data $(\phi_t)$ as disclosed in equation 29, accepts a plurality of data from the phase resolvers 34, 36 and 38 and constructs an external stimuli calibration table. The calibration table consists of a plurality of constants $(\phi_c)$ where the constant $\phi_c$ is equal to the truth data $(\phi_t)$ minus the measured value $(\phi_m)$. The constants $(\phi_{1c})$ are applied to the subsequent measured values $(\phi_{1m})$ by addition resulting in the corrected phase values $(\phi_1)$ shown below:

$$\phi_c = \phi_t - \phi_m \qquad (32)$$

$$\phi_1 = \phi_{1m} + \phi_{1c}. \qquad (33)$$

The calibration computer 64 also activates an internal calibration signal generator 66 at periodic intervals during the operation of the passive ranging system 10. The signal generator 66 produces an internal calibration table in a manner similar to that described for developing the external stimuli. The function of the internal calibration table is to correct for slow drift of the phase characteristics associated with temperature and age of analog components in the phase resolvers 34, 36 and 38 and in the frequency resolver 42. The internal stimuli calibration constants are produced by comparing phase measurements of the known stimuli with current measurements where the phase measurements of the known stimuli were established at the time of external calibration. The differential between the phase measurements of the known stimuli and the current measurements is added to the calibration constants $(\phi_c)$ and utilized to correct subsequent measurements $(\phi_m)$ during the operation of the passive ranging system 10.

The accuracy of the range measurements to the emitter source 14 is dependent upon the spacing of the elements of the antenna system 12, the operating frequency and the signal strength of the emitter source 14. Depending on these variables, the passive ranging system 10 may be employed to measure range to the emitter source 14 at extreme distances. The invention is applicable to any range of frequencies from a few hertz to the optical frequency range. Further, the invention is applicable in any medium in which radiated energy obeys the theory of wave propagation and in any medium in which the velocity of propagation is known.

The following is a two stage treatment which addresses the ambiguities that exist in the range measurement to the emitter source 14. The treatment is based upon showing that the radiated electromagnetic energy or rays from the emitter source 14 are sufficiently parallel to satisfy the condition that $(b\phi_3 - c\phi_2)$ is approximately equal to zero as the term appears in the denominator of equation (26) below:

$$R = \frac{bc(c-b)(a^2 - \phi_1^2)}{2a^2(b\phi_3 - c\phi_2)} \quad (26)$$

where $$R > \frac{bc(c-b)}{2\lambda}.$$

Note that baseline "a" is chosen such that $\phi_1$ is unambiguous so that "a" is less than or equal to the ½ wavelength ($\lambda/2$).

Figure 3:
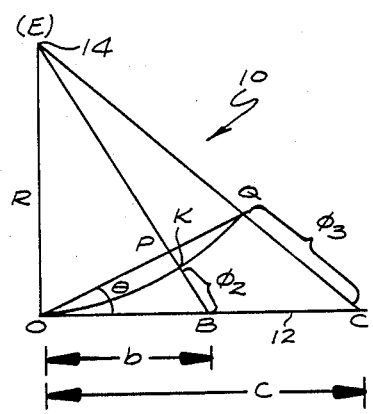
FIG. 3 is a first graphical illustration of the geometry for ambiguity resolution of the passive ranging system of FIG. 1.

If the emitter source 14 is a sufficient distance away as shown in FIG. 3, lines EO, EB and EC may be considered parallel, angle OQC is considered a right angle, and the arc OQ will fall on the line OQ. For this condition, the distance QC is equal to $\phi_3$ and the distance KB is equal to $\phi_2$ so that the $$\sin\theta = (\phi_3/c) \approx \phi_2/b. \quad (34)$$

Upon expanding equation (34), $(b\phi_3) \approx (c\phi_2)$ and upon transposing, $(b\phi_3 - c\phi_2) = 0$. Note that this term is in the denominator of equation (26) above and results in the range of "R" to the emitter source 14 becoming unambiguous and non-definable since the zero in the denominator of equation (26) leads to an undefinable solution.

Figure 4:
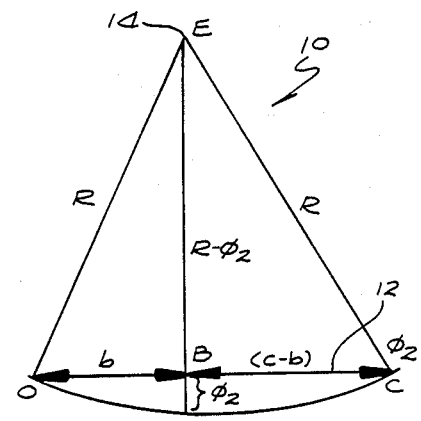
FIG. 4 is a second graphical illustration of the geometry for ambiguity resolution of the passive ranging system of FIG. 1.

Fortunately, for the ranges of interest, PB is not equal to $\phi_2$ as shown in FIG. 3 and thus $(\phi_3/c)$ is not equal to $(\phi_2/b)$ as shown in equation (34). Under these conditions, arc OQ is not equal to line OQ. To determine the minimum range "R" for which the distance to the emitter source 14 is unambiguous, consider the worst case situation. This situation occurs when line OQ is of maximum length so that line OQ falls on line OC providing maximum curvature to the arc OQ. This condition is illustrated in FIG. 4.

For this case, $\phi_3$ is equal to zero because line OQ falls on line OC. Further, based upon right angle trigonometry, the following equation results:

$$R^2 = (c-b)^2 + (R-\phi_2)^2 \quad (35)$$

and upon expanding the term $(R-\phi_2)^2$ and collecting terms, the range "R" is approximately equal to the quantity $(c-b)^2/2\phi_2$. Under these conditions, the range "R" to the emitter source 14 will be unambiguous if $(\phi_2)$ is unambiguous. Thus, if the condition that $(\phi_2)$ is less than or equal to the wavelength ($\lambda$) of the radiated energy, then the minimum range for which the range "R" is unambiguous is:

$$R\ min = \frac{(c-b)^2}{2\lambda} \quad (36)$$

The greatest accuracy occurs when c=2b so that equation (36) becomes:

$$R\ Min = (b^2/2\lambda). \quad (37)$$

This result varies slightly from the limitation and result presented in equations (17) and (18).

Figure 5:
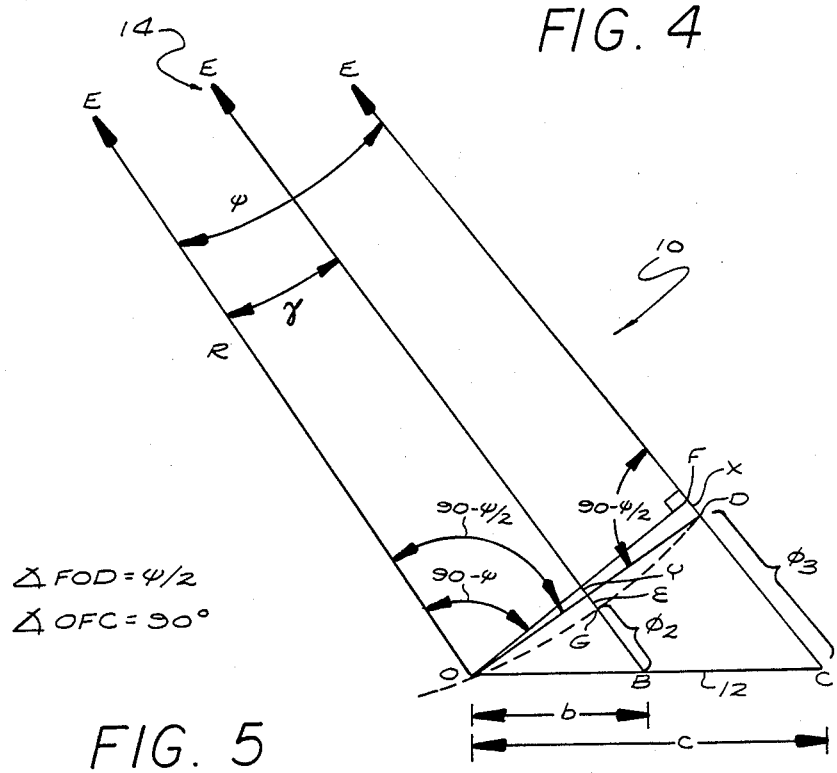
FIG. 5 is a third graphical illustration of the geometry for ambiguity resolution of the passive ranging system of FIG. 1.

The second stage of the treatment that addresses the ambiguities that exist in the range measurement to the emitter source 14 is as follows. The emitter source 14 at point "E" on FIG. 5 is the apex of triangle OEC and is of sufficient distance such that chord $\overline{OD}$ very nearly coincides with line $\overline{OF}$. Line $\overline{OF}$ is constructed to be orthogonal to line $\overline{EC}$ while lines $\overline{EO}$, $\overline{EG}$ and $\overline{ED}$ are radii of arc OGD. The distance "x" is the small distance separating lines $\overline{OF}$ and $\overline{OD}$ along radius $\overline{ED}$. Distances "y" and "$\epsilon$" are the distances between lines $\overline{OF}$ and $\overline{OD}$ and between line $\overline{OD}$ and arc OGD, respectively.

When the lines $\overline{EO}$, $\overline{EB}$ and $\overline{EC}$ are parallel and line $\overline{OD}$ exactly coincides with line $\overline{OF}$, the distances "x", "y" and "$\epsilon$" will be equal to zero. Under these condition, the sine function of angle DOC is equal to $\phi_3/c$ and $\phi_2/b$ so that:

$$(\phi_2/b) = (\phi_3/c) \quad (38)$$

resulting in the denominator of the range equation (9) being $(c\phi_2 - b\phi_3)$ which is equal to zero.

For practical targets, lines $\overline{OD}$ and $\overline{OF}$ do not exactly coincide so that distances "x", "y" and "$\epsilon$" are not equal to zero. These distances can be quantified as follows:

$$\text{CHORD } \overline{OD} = 1\ 2R\ \sin(\psi/2) \quad (39)$$

where "l" is the approximate length of $R\psi$. The distance "x" is determined to be:

$$\text{"x"} = 1\ \sin(\psi/2) = 2R\ \sin^2(\psi/2). \quad (40)$$

Since the best range accuracy occurs when the distance "c" = (2b) and thus the angle $\gamma$ is approximately equal to (½) $\psi$, then the distance $$\text{"y"} = (½)\ \tan(\psi/2) = R\ \sin(\psi/2)\ \tan(\psi/2) \quad (41)$$

and the distance epsilon is:

$$\text{"}\epsilon\text{"} = (½)\ \tan(\psi/4) = R\ \sin(\psi/2)\ \tan(\psi/4). \quad (42)$$

Since, for small angles, the $\sin\psi = \tan\psi = \psi$, then the equations for the distances "x", "y" and "$\epsilon$" may be rewritten as:

$$\text{"x"} = 2R\ \sin^2(\psi/2) = 2R\ \sin(\psi/2)\ \sin(\psi/2) = 2R(\psi^2/2) \approx R\psi^2/2 \quad (43)$$

$$\text{"y"} = R\ \sin(\psi/2)\ \tan(\psi/2) = R(\psi/2)(\psi/2) \approx R(\psi^2/4) \quad (44)$$

$$\text{"}\epsilon\text{"} = R\ \sin(\psi/2)\ \tan(\psi/4) = R(\psi/2)(\psi/4) \approx R(\psi^2/8) \quad (45)$$

Further, since "l" is approximately equal to $(R\psi)$ and since "l" is less than or equal to "c" which equals "2b", then the distances "x", "y" and "$\epsilon$" are maximum when the following situation exists. Beginning with equation (43) where the distance $$\text{"x"} = \frac{R\psi^2}{2} = \frac{R(1/R)^2}{2} = \frac{R\ 1^2}{2R^2} = \frac{1^2}{2R}, \text{ then} \quad (46)$$

$$\text{"x"} = \frac{1^2}{2R} = \frac{c^2}{2R} = \frac{(2b)^2}{2R} = \frac{4b^2}{2R} = \frac{2b^2}{R}.$$

Next, beginning with equation (44) where the distance $$\text{"y"} = \frac{R\psi^2}{4} = \frac{R(1/R)^2}{4} = \frac{R1^2}{4R^2} = \frac{1^2}{4R} = \frac{c^2}{4R}, \text{ then} \quad (47)$$

-continued
$$\text{``}y\text{''} = \frac{c^2}{4R} = \frac{(2b)^2}{4R} = \frac{4b^2}{4R} = \frac{b^2}{R}.$$

Finally, beginning with equation (45) where the distance $$\text{``}\epsilon\text{''} = \frac{R\psi^2}{8} = \frac{R(1/R)^2}{8} = \frac{R1^2}{8R^2} = \frac{1^2}{8R} = \frac{c^2}{8R}. \text{ then} \quad (48)$$

$$\text{``}\epsilon\text{''} = \frac{c^2}{8R} = \frac{(2b)^2}{8R} = \frac{4b^2}{8R} = \frac{b^2}{2R}.$$

Thus, the distances "x", "y" and "$\epsilon$" are maximum when equal to the values recited in equations (46), (47) and (48).

For the practical case in which line $\overline{OD}$ and line $\overline{OF}$ do not quite coincide, equation (38) is written:

$$c\phi_2 - b\phi_3 = c(y + \epsilon + \phi_{2m} + N_2\lambda) - b(x + \phi_{3m} + N_3\lambda) = P = 0. \quad (49)$$

The parameters $\phi_{2m}$ and $\phi_{3m}$ are measured values and thus each is less than the wavelength ($\lambda$) of the radiated energy, "$N_2$" and "$N_3$" are each integers greater than or equal to one, and "P" is a small value nearly equal to zero and dependent on the value of "R". From equation (49), it can be determined that:

$$cN_2\lambda = bN_3\lambda \quad (50)$$

because $\phi_{2m}$ and $\phi_{3m}$ are each less than the wavelength ($\lambda$). Rewriting equation (49) provides:

$$c\phi_{2m} - b\phi_{3m} = bx - c(y + \epsilon) \quad (51)$$

Since $cN_2\lambda - bN_3\lambda = 0$.

Noting that "x"=$(2b^2/R)$, "y"=$(b^2/R)$ and "$\epsilon$"=$(c^2/8R)$ from equations (46), (47) and (48), and that c=2b, equation (51) becomes:

$$(2b)\phi_{2m} - b\phi_{3m} = b\frac{(2b^2)}{R} - (2b)\left[\frac{b^2}{R} + \frac{(2b)^2}{8R}\right]$$

which reduces to
$$2b\phi_{2m} - b\phi_{3m} = (-b^3/R) \quad (52)$$

Upon removing the common term "b", equation (52) becomes:

$$2\phi_{2m} - \phi_{3m} = -\frac{b^2}{R} = -\frac{(c/2)^2}{R} = -\frac{c^2}{4R} \quad (53)$$

since c=2b.

Note that the maximum difference in equation (53) occurs when $\phi_{2m}$ is equal to plus or minus the wavelength ($\lambda$) divided by two and when $\phi_{3m}$ is equal to minus or plus the wavelength ($\lambda$) divided by two. Using this criteria and substituting into equation (53), results in:

$$2(\lambda/2) - (-\lambda/2) = -(b^2/R) = -(c^2/4R)$$

$$2(\lambda/2) + (\lambda/2) = -(b^2/R) = -(c^2/4R)$$

$$3\lambda/2 = -(b^2/R) = -(c^2/4R)$$

In order to satisfy the range equation (9), the following condition must be satisfied:

$$(3\lambda/2) \geq b^2/R. \quad (54)$$

Transposing the inequality of equation (54) and solving for the range to the emitter source 14 provides:

$$R \geq 2b^2/3\lambda. \quad (55)$$

Again noting that c=2b, then the range can be expressed in terms of parameter "c" as:

$$R \geq c^2/6\lambda. \quad (56)$$

Thus, the range equation (9) which expresses the distance from the antenna system 12 to the emitter source 14 is valid for values of range "R" satisfying the condition expressed in equation (56). This result is valid because equation (49) is satisfied which is the test for sufficient parallelism between the lines $\overline{EO}$, $\overline{EB}$ and $\overline{EC}$. Therefore, the radiated energy rays transmittd from the emitter source 14 are sufficiently parallel to satisfy the condition that $(b\phi_3 - c\phi_2)$ is approximately equal to zero as the term appears in the denominator of equation (26).

From the foregoing, it will be appreciated that the passive ranging system of the present invention which includes a translation resolution system and a digital computational system substantially simplifies the determination of the instantaneous range to an emitter source and that the ranging system will determine the range to a fixed or moving emitter source when the emitter signal waveform is unmodulated or randomly modulated, thereby reducing the quantity of measurement parameters required. Further, the ranging system will determine the range when the parameter measurements are available only from a single location which may be either fixed or moving, and since knowledge of the relative motion between the emitter source and the measuring platform is not required, further simplification results.

While a particular form of the invention has been illustrated and described, it will be apparent that various modifications can be made without departing from the spirit and scope of the invention. Accordingly, it is not intended that the invention be limited, except as by the appended claims.

What is claimed is:

1. A passive radar ranging apparatus for determining the instantaneous range to an emitter source comprising, in combination:
   receiving means for receiving a plurality of radiated electromagnetic energy, said received electromagnetic energy having a non-cooperative waveform and an unspecified frequency;
   translating means in communication with said receiving means for translating a first parameter of said received electromagnetic energy for detection and phase measurement;
   first resolving means in communication with said translating means for providing a plurality of distance oriented digital phase measurements, said phase measurements being determined directly from said received electromagnetic energy;
   second resolving means in communication with said translating means for resolving said first parameter and for providing said resolved first parameter to said first resolving means for utilization in providing said phase measurements;

computing means connected to said first resolving means for receiving and manipulating said plurality of distance oriented digital phase measurements and for determining said instantaneous range to said emitter source of said radiated electromagnetic energy, and further including means for resolving phase ambiguities of said received electromagnetic energy wherein said phase measurements are available only from said emitter source and knowledge of relative motion between said emitter source and said receiving means is unknown; and displaying means for displaying said instantaneous range to said emitter source wherein said displayed instantaneous range is equivalent to $R = [bc(c-b)(a^2 - \phi_1{}^2)/2a^2(b\phi_3 - c\phi_2)]$.

2. The radar ranging apparatus of claim 1 wherein said receiving means is comprised of a plurality of reception elements.

3. The radar ranging apparatus of claim 2 wherein said plurality of reception elements are aligned in a linear fashion, each reception element being spaced from an adjacent element by a spacing parameter.

4. The radar ranging apparatus of claim 1 wherein said receiving means is comprised of a plurality of antenna elements.

5. The radar ranging apparatus of claim 4 wherein each of said antenna elements is aligned in a straight line.

6. The radar ranging apparatus of claim 4 wherein each of said antenna elements is spaced from each adjacent element by a fixed spacing parameter.

7. The radar ranging apparatus of claim 1 wherein said plurality of radiated electromagnetic energy is received by said receiving means in a plurality of phase fronts.

8. The radar ranging apparatus of claim 7 wherein each of said plurality of phase fronts is located along a locus of points passing through one of a plurality of reception elements comprising said receiving means.

9. The radar ranging apparatus of claim 1 wherein said translating means comprises a plurality of frequency translators.

10. The radar ranging apparatus of claim 1 wherein said first resolving means comprises a plurality of phase resolvers.

11. The radar ranging apparatus of claim 1 wherein said second resolving means comprises a frequency resolver.

12. The radar ranging apparatus of claim 1 wherein said computing means comprises a digital computation system.

13. The radar ranging apparatus of claim 1 wherein each of said plurality of distance oriented digital phase measurements are transmitted to one of a plurality of primary adder circuits in said computing means.

14. The radar ranging apparatus of claim 13 wherein each of said primary adder circuits provides a sum of one of said distance oriented digital phase measurements and a corresponding phase correction value.

15. The radar ranging apparatus of claim 14 wherein each of said sums comprises a corrected phase signal.

16. The radar ranging apparatus of claim 1 wherein each of said distance oriented digital phase measurements is summed to a corresponding phase correction value for providing a plurality of corrected phase signals, each of said corrected phase signals being transmitted to one of a plurality of multiplier circuits.

17. The radar ranging apparatus of claim 16 wherein each of said corrected phase signals is multiplied by a plurality of apparatus spacing parameters stored in said multiplier circuits.

18. The radar ranging apparatus of claim 17 wherein each of said parameter corrected phase signals is transmitted from said multiplier circuits to one of a plurality of secondary adder circuits for adding a plurality of output signals of said multiplier circuits.

19. The radar ranging apparatus of claim 1 wherein said computing means further includes a divider circuit for receiving a pair of parameter corrected phase signals from a plurality of adders and multipliers located within said computing means.

20. The radar ranging apparatus of claim 19 wherein said divider circuit provides a fractional output signal, said fractional output signal being said instantaneous range to said emitter source.

21. The radar ranging apparatus of claim 1 wherein said computing means determines said instantaneous range to said emitter source providing an output signal, said output signal being transmitted to said displaying means for providing communication of said determined instantaneous range.

22. The radar apparatus of claim 1 wherein said computing means further includes a calibration means.

23. The radar ranging apparatus of claim 22 wherein said calibration means provides a phase correction value, said phase correction value being transmitted to each of a plurality of primary adder circuits.

24. The radar ranging apparatus of claim 1 further including a calibration signal generator in electrical communication with a calibrating means, said calibration signal generator for providing a correction signal.

25. The radar ranging apparatus of claim 24 wherein said correction signal provided by said calibration signal generator is transmitted to each of a plurality of receiving elements of said reception means.

26. The radar ranging apparatus of claim 1 wherein said displaying means is in electrical communication with a calibrating means, said displaying means for transmitting a plurality of parameters to said calibrating means.

27. The radar ranging apparatus of claim 26 wherein said transmitted plurality of parameters includes said instantaneous range to said emitter source.

28. A passive radar ranging system for determining the instantaneous range to an emitter source comprising, in combination:

an antenna system for receiving a plurality of radiated electromagnetic energy, said received electromagnetic energy having a non-cooperative waveform and an unspecified frequency;

a plurality of frequency translators in communication with said antenna system for translating a frequency parameter of said received electromagnetic energy for detection and phase measurement;

a plurality of phase resolvers in communication with said plurality of frequency translators for providing a plurality of distance oriented digital phase measurements, said phase measurements being determined directly from said received electromagnetic energy;

a frequency resolver in communication with one of said plurality of frequency translators for resolving said frequency parameter and for providing said resolved frequency parameter to each of said plurality of phase resolvers for utilization in providing said phase measurements;

a computing system connected to said plurality of phase resolvers for receiving and manipulating said plurality of distance oriented digital phase measurements and for determining said instantaneous range to said emitter source of said radiated electromagnetic energy, and further including means for resolving phase ambiguities of said received electromagnetic energy wherein said phase measurements are available only from said emitter source and knowledge of relative motion between said emitter source and said receiving means is unknown; and a display device for displaying said instantaneous range to said emitter source wherein said displayed instantaneous range is equivalent to $R=[bc(c-b)(a^2-\phi_1^2)/2a^2(b\phi_3-c\phi_2)]$.

29. The passive radar ranging system of claim 28 wherein said antenna system is comprised of a plurality of antenna elements.

30. The passive radar ranging system of claim 29 wherein said plurality of antenna elements are aligned in a linear fashion, each antenna element being spaced from an adjacent element by a fixed spacing parameter.

31. The passive radar ranging system of claim 28 wherein said plurality of radiated electromagnetic energy is received by said antenna system in a plurality of phase fronts.

32. The passive radar ranging system of claim 31 wherein each of said plurality of phase fronts is located along a locus of points passing through one of a plurality of antenna elements comprising said antenna system.

33. The passive radar ranging system of claim 28 wherein each of said plurality of distance oriented digital phase measurements are transmitted to one of a plurality of primary adder circuits in said computing system.

34. The passive radar ranging system of claim 33 wherein each of said primary adder circuits provides a sum of one of said distance oriented digital phase measurements and a corresponding phase correction value.

35. The passive radar ranging system of claim 34 wherein each of said sums comprises a corrected phase signal.

36. The passive radar ranging system of claim 28 wherein each of said distance oriented digital phase measurements is summed to a corresponding phase correction value for providing a plurality of corrected phase signals, each of said corrected phase signals being transmitted to one of a plurality of multiplier circuits.

37. The passive radar ranging system of claim 36 wherein each of said corrected phase signals is multiplied by a plurality of apparatus spacing parameters stored in said plurality of multiplier circuits.

38. The passive radar ranging system of claim 37 wherein each of said parameter corrected phase signals is transmitted from said multiplier circuits to one of a plurality of secondary adder circuits for adding a plurality of output signals of said plurality of multiplier circuits.

39. The passive radar ranging system of claim 28 wherein said computing system further includes a divider circuit for receiving a pair of parameter corrected phase signals from a plurality of adders and multipliers located within said computing system.

40. The passive radar ranging system of claim 39 wherein said divider circuit provides a fractional output signal, said fractional output signal being said instantaneous range to said emitter source.

41. The passive radar ranging system of claim 28 wherein said computing system determines said instantaneous range to said emitter source providing an output signal, said output signal being transmitted to said display device for providing communication of said determined instantaneous range.

42. The passive radar ranging system of claim 28 wherein said computing system further includes a calibrating means.

43. The passive radar ranging system of claim 42 wherein said calibrating means provides a phase correction value, said phase correction value being transmitted to each of a plurality of primary adder circuits.

44. The passive radar ranging system of claim 28 further including a calibration signal generator in electrical communication with a calibrating means, said calibration signal generator for providing a correction signal.

45. The passive radar ranging system of claim 44 wherein said correction signal provided by said calibration signal generator is transmitted to each of a plurality of antenna elements of said antenna system.

46. The passive radar ranging system of claim 28 wherein said display device is in electrical communication with a calibrating means, said display device for transmitting a plurality of parameters to said calibrating means.

47. The passive radar ranging system of claim 46 wherein said transmitted plurality of parameters includes said instantaneous range to said emitter source.

48. A method for determining the instantaneous range to an emitter source, said method comprising the steps of:

receiving a plurality of radiated electromagnetic energy with an antenna system, said received electromagnetic energy having a non-cooperative waveform and an unspecified frequency;

translating a frequency parameter of said received electromagnetic energy with a plurality of frequency translators for detection and phase measurement;

providing a plurality of distance oriented digital phase measurements from said frequency parameter within a plurality of phase resolvers, said phase measurements being determined directly from said received electromagnetic energy;

resolving said frequency parameter and providing said resolved frequency parameter to each of said plurality of phase resolvers for utilization in providing said phase measurements;

resolving phase ambiguities of said received electromagnetic energy for identifying which of a plurality of wavefronts of said non-cooperative waveform is being intercepted by said antenna system;

manipulating said plurality of distance oriented digital phase measurements for determining said instantaneous range to said emitter source of said radiated electromagnetic energy wherein said phase measurements are available only from said emitter source and knowledge of relative motion between said emitter source and said antenna system is unknown; and displaying said instantaneous range to said emitter source wherein said displayed instantaneous range is equivalent to $R=[bc(c-b)(a^2-\phi_1^2)/2a^2(b\phi_3-c\phi_2)]$.

* * * * *